United States Patent Office 3,252,982
Patented May 24, 1966

3,252,982
BENZHYDRYL COMPOUNDS
Renat Herbert Mizzoni, Long Valley, and Robert Paul Mull, Florham Park, N.J., assignors to Ciba Corporation, New York, N.Y., a corporation of Delaware
No Drawing. Filed Oct. 16, 1963, Ser. No. 316,534
5 Claims. (Cl. 260—293)

The present invention involves N-(guanidino-alkyl)-N,N-alkylene-imine compounds or salts thereof. More particularly, it relates to N-(guanidino-lower alkyl)-N,N-alkylene-imines, in which the alkylene-imine ring system has from five to eight ring members, and one of its ring carbon atoms is substituted by a group of the formula

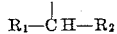

in which each of the two groups $R_1$ and $R_2$ is a monocyclic carbocyclic aryl group of a monocyclic hexacyclic alicyclic group, and in which the guanidino portion is separated from the imine-nitrogen by at least two carbon atoms, and salts thereof, as well as process for the preparation of such compounds.

Apart from the group of the formula

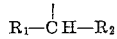

the carbon atoms of the N,N-alkylene-imine ring system, representing above all a piperidine nucleus, as well as a pyrrolidine, a hexahydro-azepine or an octahydro-azocine nucleus, are unsubstituted or may contain other substituents, such as lower alkyl, e.g. methyl, ethyl, n-propyl and the like.

In the substituent

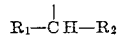

each of the groups $R_1$ and $R_2$ is monocyclic carbocyclic aryl, i.e. phenyl or phenyl substituted by one or more than one of the same or of different substituents attached to any of the positions available for substitution; suitable substituents are lower alkyl, e.g. methyl, ethyl, n-propyl, isopropyl, n-butyl and the like, lower alkoxy, e.g. methoxy, ethoxy, n-propyloxy, isopropyloxy, n-butyloxy and the like, halogeno, e.g. fluoro, chloro, bromo and the like, trifluoromethyl or any other equivalent substituent. Preferred monocyclic carbocyclic aryl groups representing $R_1$ and/or $R_2$ are phenyl, (lower alkyl)-phenyl, (lower alkoxy)-phenyl, (halogeno)-phenyl, (trifluoromethyl)-phenyl and the like. A monocyclic, hexacyclic alicyclic group representing $R_1$ and/or $R_2$ is above all cyclohexyl, but may also be (lower alkyl)-cyclohexyl, in which lower alkyl has the previously given meaning.

The guanidino group is separated from the imine-nitrogen by at least two, preferably by two to three, carbon atoms. The lower alkyl portion linking the guanidino group with the imine-nitrogen, has, therefore, at least two, preferably two to three, carbon atoms and is represented by 1,2-ethylene, 1-methyl-1,2-ethylene or 1,3-propylene, as well as 1-methyl-1,3-propylene, 2-methyl-1,3-propylene, 1,4-butylene and the like.

The guanidino group is represented by the formula

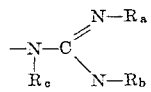

in which $R_a$, $R_b$ and $R_c$ is hydrogen or an organic radical, preferably an aliphatic group, such as lower alkyl, particularly methyl, as well as ethyl, n-propyl, isopropyl, n-butyl, isobutyl, secondary butyl, tertiary butyl and the like, as well as an araliphatic group, such as phenyl-lower alkyl, particularly benzyl, as well as 1-phenylethyl, 2-phenylethyl and the like.

Salts of the compounds of this invention are acid addition salts, primarily pharmaceutically acceptable, non-toxic acid addition salts with pharmaceutically acceptable acids, particularly inorganic acids, e.g. hydrochloric, hydrobromic, nitric, sulfuric, phosphoric acids and the like, or organic acids, such as organic carboxylic acids, e.g. acetic, malonic, succinic, maleic, hydroxymaleic, fumaric, malic, tartaric, citric, benzoic, nicotinic, isonicotinic acid and the like, or organic sulfonic acids, e.g. methane sulfonic, ethane sulfonic, 2-hydroxyethane sulfonic, ethane 1,2-disulfonic, p-toluene sulfonic, naphthalene 2-sulfonic acid and the like. Acid addition salts may also serve as intermediates, for example, in the purification of the free compounds or for the preparation of other acid addition salts, or for identification and characterization purposes. Particularly useful for the latter are salts with acidic organic nitro compounds, e.g. picric, picrolonic, flavianic acid and the like, or with metal complex acids, e.g. phosphotungstic, phosphomolybdic, chloroplatinic, Reinecke acid and the like.

The compounds of this invention are in the form of mixtures of racemates or single isomeric compounds.

The compounds of the present invention, which may be represented by the following structural formula

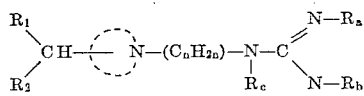

in which $R_1$, $R_2$, $R_a$, $R_b$ and $R_c$ have the previously-given meaning, the group of the formula

is an N,N-alkylene-imino group which has from five to eight ring members, and in which one of its ring carbon atoms is substituted by the group of the formula

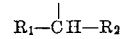

and the group of the formula —$(C_nH_{2n})$— is lower alkylene separating the guanidino group from the imino-nitrogen by at least two carbon atoms, or the salts thereof, cause a marked decrease of the gastric secretion of hydrochloric acid. This pharmacological effect is demonstrated with a test using the Pavlov pouch dog, in which gastric secretion is stimulated by feeding a meat meal, as well as with a test using dogs with gastric fistulae, in which gastric secretion is induced by histamine. In both of these tests, the compounds of the present invention, which are orally active, cause a decrease of the gastric secretion. The compounds of this invention are, therefore, useful in the management and treatment of gastric irritation or gastric ulcers by reducing the amount of free hydrochloric acid in the stomach. They are also useful as research tools in the study of the mechanism of gastric secretion of hydrochloric acid.

Particularly useful are 1-(guanidino-lower alkyl)-piperidines, in which one of the ring carbon atoms of the piperidine nucleus is substituted by a benzhydryl group or a polyhydro-benzhydryl group, and in which the guanidino portion is separated from the ring nitrogen atom by two to three carbon atoms, or acid addition salts thereof. These compounds are represented by the following formula

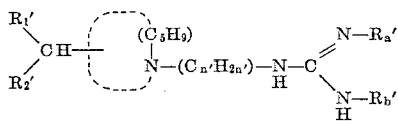

in which each of the groups $R_1'$ and $R_2'$ is phenyl, (lower alkyl)-phenyl, (lower alkoxy)-phenyl, (halogeno)-phenyl, or cyclohexyl, the group of the formula —$(C_5H_9)$— is a 1,5-pentylene radical substituted by the group of the formula

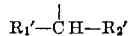

the group of the formula —$(C_{n'}H_{2n'})$— is alkylene having from two to three carbon atoms and separating the guanidino group from the ring nitrogen by two to three carbon atoms, and each of the groups $R_a'$ and $R_b'$ is hydrogen or lower alkyl, or acid addition salts thereof.

Preferred compounds are the 1-guanidino-lower alkyl-piperidines, in which the 3-position is substituted by the group of the formula

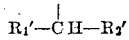

$R_1'$ and $R_2'$ having the previously given meaning, and in which lower alkyl separates the guanidino group from the ring nitrogen by two to three carbon atoms, or acid addition salts thereof; these compounds are represented by the formula

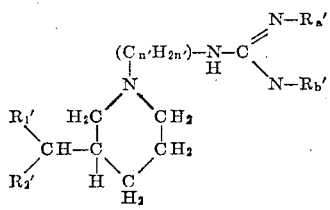

in which $R_1'$, $R_2'$, $R_a'$, $R_b'$ and the group of the formula —$(C_{n'}H_{2n'})$— have the previously-given, or acid addition salts thereof.

The compounds of this invention are useful in the form of compositions suitable for enteral or parenteral use, consisting essentially of a pharmacologically effective amount of one of the new guanidine compounds of this invention, preferably in the form of their pharmaceutically acceptable acid addition salts, in admixture with a pharmaceutically acceptable, organic or inorganic, solid or liquid carrier, which usually represents the major portion by weight of such compositions. These preparations are in solid form, for example, as capsules, tablets, dragees and the like, or in liquid form, for example, as solutions, suspensions, emulsions and the like. Suitable carrier materials are, for example, starches, e.g. corn starch, wheat starch and the like, sugars, e.g. lactose, sucrose and the like, stearic acid or salts thereof, e.g. magnesium stearate and the like, stearyl alcohol, talc, gums, acacia, tragacanth, polyalkylene glycols, propylene glycol and the like. The quantity and the nature of the carrier ingredients may vary widely and depend inter alia upon the desired physical appearance or size of the composition, method of manufacture and the like. Encapsulation may be effected using, if desired, the same excipients as those used for tablets. If necessary, the compositions having as the effective pharmacological ingredient one of the compounds of this invention, may contain other auxiliary substances, such as preserving, stabilizing, wetting, emulsifying agents and the like, salts for varying the osmotic pressure, buffers, etc. They may also contain, in combination, other useful substances. The compounding of the formulations is generally carried out in the manner normally employed in the art, i.e. by manufacturing a mixture, a granulate and the like. Any compatible color, approved and certified under the provisions of the Federal Food, Drug and Cosmetic Law may be used for aesthetic purposes or as a means of identification.

The new compounds of this invention are prepared according to known methods, for example, by converting an N-(amino-lower alkyl)-N,N-alkylene-imine, in which the N,N-alkylene-imine ring system has from five to eight ring members, and one of its ring carbon atoms is substituted by a group of the formula

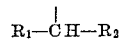

in which each of the two groups $R_1$ and $R_2$ is a monocyclic carbocyclic aryl group or a monocyclic hexacyclic alicyclic group, and in which amino, separated from the imino-nitrogen by at least two carbon atoms, has at least one hydrogen atom or instead a substituent capable of being converted into an amidino group, or a salt thereof, such amino group into a guanidino group, and, if desired, converting a resulting salt into the free compound or into another salt, and/or, if desired, converting a free compound into a salt thereof, and/or, if desired, separating a resulting mixture of isomers into the single isomers.

The preferred starting materials used in the above reaction are those, in which the amino group has at least one hydrogen atom, and is represented, for example, by the group of the formula —NH—$R_c$, in which $R_c$ has the previously-given meaning. The reagents of choice for the conversion of such amino group into a guanidino group are the S-lower alkyl-isothioureas or O-lower alkyl-isoureas, particularly those of the formula

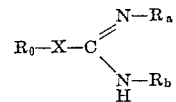

in which $R_a$ and $R_b$ have the previously-given meaning, $R_0$ stands for lower alkyl, particularly methyl, as well as ethyl, n-propyl, isopropyl and the like, and X is primarily sulfur, as well as oxygen, or acid addition salts thereof. The latter, which are employed in preference over the free compound, are especially the salts with mineral acids, such as hydrochloric, hydrobromic, or, particularly, sulfuric acid and the like. The preferred reagents are the mineral acid addition salts of S-methyl-isothioureas, e.g. S-methyl-isothiourea hydrochloride, sulfate and the like. The starting materials are preferably used in the form of the free compounds.

The reaction is carried out by contacting the starting material with the reagent, preferably in the presence of a diluent, the choice of which depends primarily on the solubility of the reactants. Water or water-miscible organic solvents, such as lower alkanols, e.g. methanol, ethanol, propanol, isopropanol, tertiary butanol and the like, ethers, e.g. diethyleneglycol dimethylether, p-dioxane, tetrahydrofuran and the like, ketones, e.g. acetone, ethyl methyl ketone and the like, lower alkanoic acids, e.g. acetic acid and the like, formamide, e.g. formamide, N,N-dimethylformamide and the like, or aqueous mixtures of such solvents are preferred diluents. The reaction may be carried out at room temperature or at an elevated temperature, for example, on the steam bath or at the boiling temperature of the solvent, if necessary, in the atmosphere of an inert gas, e.g. nitrogen.

Another reagent capable of transforming an amino group having at least one hydrogen atom into the desired guanidino group, is a cyanamide compound, especially a compound of the formula

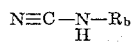

in which $R_b$ has the previously-given meaning. For example, a mixture of the cyanamide reagent with the amine starting material, which is preferably used in the form of a salt thereof, particularly a mineral acid addition salt, e.g. the hydrochloride, hydrobromide, sulfate and the like, is heated to form a melt, which is then dissolved in a solvent, such as a lower alkanoic acid, e.g. acetic acid and the like, and the desired product is isolated. The reaction may also be performed in the presence of a suitable solvent, such as a lower alkanol, e.g. ethanol and the like. The salt used as the starting material may also be formed in situ by carrying out the reaction in the presence of an acid, particularly of a concentrated aqueous mineral acid, e.g. hydrochloric acid and the like. The cyanamide reagent too may be formed in situ; for example, 1-nitroso-3-methyl-guanidine furnishes the N-methyl-cyanamide during the reaction, and the latter then reacts with the amine starting material to form the desired guanidine compound. The reaction may proceed exothermically, and, if necessary, may be maintained by heating, for example, to form about 80° to about 200°; the atmosphere of an inert gas, e.g. nitrogen, may be advantageous.

A third modification of the general procedure for the manufacture of the compounds of this invention from the above amine starting materials, in which the amino group carries at least one hydrogen atom, comprises reacting such starting material with a salt of a 1-guanyl-pyrazole. A salt of a 1-guanyl-pyrazole is primarily a salt with a mineral acid, such as, for example, nitric acid; the pyrazole nucleus of such reagent may contain additional substituents, particularly lower alkyl, e.g. methyl, ethyl and the like. 1-guanyl-3,5-dimethyl-pyrazole salts, particularly the nitrate thereof, represent the preferred reagents. The reaction may be carried out in the absence of a solvent, for example, by fusing the two reactants, or in the presence of a diluent, such as, for example, a lower alkanol, e.g. ethanol and the like; advantageously, contact with carbon dioxide should be avoided, for example, by performing the reaction in the atmosphere of an inert gas, e.g. nitrogen. The reaction mixture is preferably heated, for example, to the melting point of the mixture or to the boiling point of the solvent.

The starting materials used in the above modification of the procedure of this invention are new and are intended to be included within the scope of this invention. They are represented by the following formula

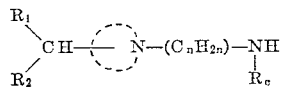

in which $R_1$, $R_2$, $R_c$ and the groups of the formulae

and $-(C_nH_{2n})-$ have the previously given meaning, or the salts thereof. The preferred starting materials are those of the formula

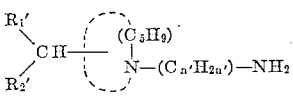

in which $R_1'$ $R_2'$ and the groups of the formulae $-(C_5H_9)-$ and $-(C_{n'}H_{2n'})-$ have the previously given meaning, or the acid addition salts thereof; these starting materials are represented by the compounds of the formula

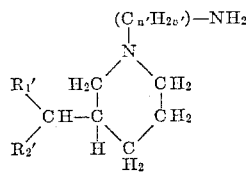

in which $R_1'$, $R_2'$ and the group of the formula

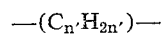

have the previously given meaning, or the acid addition salts thereof.

These starting materials are prepared according to known methods. For example, an N,N-alkylene-imine, in which the alkylene-imine ring system has from five to eight ring members, and one of its ring carbon atoms is substituted by a group of the formula

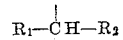

in which each of the two groups $R_1$ and $R_2$ is a monocyclic carbocyclic aryl group or a monocyclic hexacyclic alicyclic group, or a salt, such as an alkali metal salt, thereof may be treated with a halogeno-lower alkyl-nitrile, in which halogeno is, for example, chloro, bromo and the like (preferably in the presence of an additional base, e.g. sodium carbonate and the like), or with a lower alkeno-nitrile, in which the double bond is activated by the nitrile group, so that it adds to the imine-nitrogen (which reaction is carried out in the presence of a suitable base, e.g. benzyl trimethyl ammonium hydroxide and the like), and converting in a resulting N-(cyano-lower alkyl)-N,N-alkylene-imine, in which the alkylene-imine ring system has from five to eight ring members, and one of its carbon atoms is substituted by a group of the formula

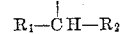

in which each of the two groups $R_1$ and $R_2$ is a monocyclic carbocyclic aryl group or a monocyclic hexacyclic alicyclic group, cyano into amino-methyl by reduction. The latter may be carried out, for example, by catalytic hydrogenation, such as, treatment with hydrogen in the presence of a catalyst containing a metal of the eight group of the Periodic System, e.g. palladium on charcoal, Raney nickel and the like, or by treatment with a light metal hydride, for example, an aluminum hydride, e.g. lithium aluminum hydride, sodium aluminum hydride, magnesium aluminum hydride, aluminum borohydride, aluminum hydride and the like, which reagents may be used, if desired, in the presence of an activator, such as aluminum chloride and the like.

Other amine starting materials useful in the procedure of this invention are those having a group substituting the amino-nitrogen, which is capable of being converted into an amidino group. Such starting materials are represented by the formula

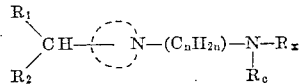

in which $R_1$, $R_2$, $R_c$ and the groups of the formulae

and $-(C_nH_{2n})-$ have the previously-given meaning, and $R_x$ is a group capable of being converted into an amidino group of the formula

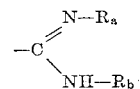

in which $R_1$ and $R_2$ have the previously-given meaning, or a salt thereof.

For example, the substituent capable of being converted into an amidino group, i.e. the group $R_x$ in the above formula, may be formed by a carbon atom attached to the nitrogen of the amino group, and to this carbon atom is connected another nitrogen atom; in addition, the carbon atom may carry a further nitrogen or substituted nitrogen, or other heteroatoms, such as, for example oxygen or sulfur, as well as substituted heteroatoms. The above substituent, represented by $R_x$, is, for example, cyano of the formula $-C \equiv N$, carbamyl, represented by the formula $-CONH-R_a$, in which $R_a$ has the above-given meaning, thiocarbamyl, having, for example, the formula $-CSNH-R_a$, lower alkoxy-(imino)methyl, having especially the formula

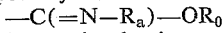

in which $R_0$ has the previously-given meaning, i.e. represents lower alkyl, primarily methyl, as well as ethyl and the like, lower alkylmercapto-(imino)methyl, as represented by the formula $-C(=N-R_a)-SR_0$, cyano-amidino, having the formula $-C(=N-R_a)-N(R_b-C\equiv N$, in which $R_b$ has the previously given meaning, guanidino-(imino)methyl, having especially the formula

isocyano-(imino)methyl represented by the formula $-C(=N-R_a)-N=C=O$, or isothiocyano-(imino)-methyl having preferably the formula

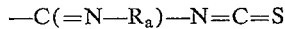

and the like. Amine starting materials having such groups attached to the amino nitrogen atom, fit the above structural requirements, i.e. to the amino group is attached a carbon atom, which carries at least one nitrogen atom, apart from any other nitrogen or hetero atoms. Starting materials having such substituents are converted into the desired guanidino derivatives according to known methods, usually by ammonolysis or aminolysis. Certain starting materials, such as those in which the substituent representing the group $R_x$ is an isocyano-(imino)methyl or an isothiocyano-(imino)methyl group, are converted into the desired guanidino compounds by hydrolysis.

Apart from amine starting materials, in which a carbon atom with a nitrogen represents the substituent of the amino nitrogen, i.e. group $R_x$, other amine starting materials, in which the substituent of the amino group is convertible into an amidino group, may be used for the manufacture of the guanidine compounds of this invention. In the conversion of such starting materials, intermediate compounds may be formed, which may have the previously-given characteristics, i.e. the carbon atom of the substituent, i.e. group $R_x$, carries a nitrogen atom. Suitable substituents of that type representing $R_x$ are, for example, ester groups, formed by a carboxyl, a thionocarboxyl, a thiolocarboxyl or a dithiocarboxyl group with a lower alkanol, as well as halogeno-carbonyl or halogeno-thionocarbonyl groups, in which halogeno represents primarily chloro.

Due to the diverse nature of the substituent represented by $R_x$, its conversion into an amidino group is carried out according to different and known process modifications, either directly or in stages, and, if necessary, in the presence of reaction promoting agents, dehydrating or desulfurizing reagents and the like, while cooling or at an elevated temperature, in a closed vessel, and/or in the atmosphere of an inert gas, e.g. nitrogen.

The amine starting materials, in which the amino-nitrogen carries a substituent capable of being converted into an amidino group, are prepared according to known methods, usually employing the previously-described amine starting materials as the appropriate intermediates.

The compounds of this invention may also be prepared by converting in an N-(guanidino-lower alkanoyl)-N,N-alkylene-imine, and N-(guanidino-lower thioalkyanoyl)-N,N-alkylene-imine, and N-(N,N-alkylene-imino)-lower alkanoic acid guanide or an N-(N,N-alkylene-imino)-lower thioalkanoic acid guanide, in which the N,N-alkylene-imine ring has from five to eight ring members and one of its ring carbon atoms is substituted by the group of the formula

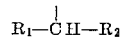

in which $R_1$ and $R_2$ have the previously-given meaning, and in which the guanidino portion is separated from the imine-nitrogen by at least two carbon atoms, the carbonyl or the thiocarbonyl group into methylene, and, if desired, carrying out the option steps.

The above starting materials are represented by the formulae

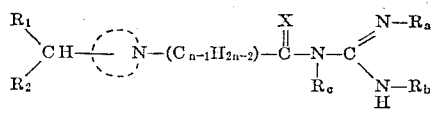

or

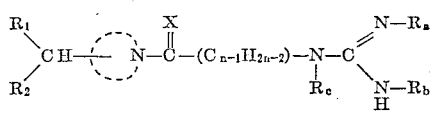

in which $R_1$, $R_2$, $R_a$, $R_b$, $R_c$ and the group of the formula

have the previously-given meaning, the group of the formula $-(C_{n-1}H_{2n-2})-$ is lower alkylene, and the group X is oxygen or sulfur.

Conversion of carbonyl into methylene is carried out according to known methods, for example, by treatment with an aluminum hydride, particularly an alkali metal aluminum hydride, e.g. lithium aluminum hydride, sodium aluminum hydride and the like, or an alkaline earth metal aluminum hydride, e.g. magnesium aluminum hydride and the like, or aluminum hydride, in the presence of a suitable inert solvent and, if necessary, at an elevated temperature. The above conversion may also be achieved by treatment with catalytically activated hydrogen using, for example, a copper-chromium catalyst, by electrolytic reduction and the like.

Replacement of sulfur in a thiocarbonyl group by two hydrogens is carried out by desulfurization according to known methods, for example, by treatment with a freshly prepared hydrogenation catalyst, such as Raney nickel, in an alcoholic solvent, e.g. methanol, ethanol and the like, if desired, in the presence of hydrogen, or by electrolytic reduction and the like.

The above starting materials are prepared according to known procedures used for the preparation of amide-type compounds; the carbonyl group in a resulting amide type compound is converted into a thiocarbonyl group by treatment with a suitable reagent, e.g. phosphorus pentasulfide and the like.

A resulting salt is converted into the free compound in the customary way, for example, by treatment with a strong alkaline reagent, such as a metal hydroxide, e.g. lithium hydroxide, sodium hydroxide, potassium hydroxide and the like, a strong quaternary ammonium anion (hydroxyl ion) exchange preparation and the like.

A resulting salt is converted into another salt according to known methods. For example, a "monosulfate" may be formed by reacting the "half-sulfate" with sulfuric acid. Furthermore, a resulting salt with an organic acid may be converted into another salt by treatment with a salt, e.g. sodium, barium, silver and the like, salt of an acid in the presence of a diluent, in which a resulting inorganic compound is insoluble and is thus removed from the reaction medium. Suitable anion exchange preparations may also serve for the conversion of one salt into another.

A free compound is transformed into an acid addition salt by reacting it, preferably a solution thereof in the presence of a solvent or solvent mixture, with the appropriate inorganic or organic acid or a solution thereof, or with an anion exchange preparation, and isolating the salt. Semi-, mono- or poly-salts may be formed, as well as mixed salts, and the salts may be isolated in the form of their hydrates or may contain solvent of crystallization.

The invention also comprises any modification of the general process, wherein a compound obtainable as an intermediate at any stage of the process is used as the starting material and the remaining step(s) of the process is(are) carried out; also included within the scope of the invention are any new intermediates.

In the process of this invention such starting materials are preferably used which lead to final products mentioned in the beginning as preferred embodiments of the invention.

The following examples illustrates the invention and are not to be construed as being limitations thereon. Temperatures are given in degrees centigrade.

Example 1

A mixture of 4.2 g. of 1-(2-aminoethyl)-3-benzhydryl-piperidine and 1.9 g. of S-methyl-isothiourea sulfate in 25 ml. of a 1:1-mixture of ethanol and water is refluxed for three hours and is then allowed to stand overnight at room temperature. The solvent is evaporated under reduced pressure; the residue is taken up in anhydrous ethanol and the solvent is again evaporated. After repeating the latter procedure several times, and then triturating the residue with diethyl ether, the 3-benzhydryl-1-(2-guanidinoethyl)-piperidine sulfate of the formula

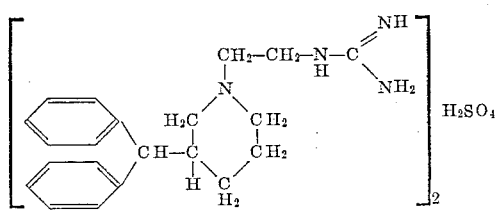

crystallizes and is recrystallized from a mixture of ethanol and diethyl ether, M.P. 155° (with decomposition); yield: 4.0 g. It analyzes as follows:

Calcd. for $C_{42}H_{48}N_8O_4S$ (M.W. 771.00): C, 63.21; H, 7.70; N, 14.04. Found: C, 63.07; H, 7.65; N, 13.81.

The starting material used in the above procedure is prepared as follows: A mixture of 3-benzhydryl-piperidine, 11.8 g. of chloroacetonitrile and 42 g. of sodium carbonate in 150 ml. of toluene and 3.5 g. of water is refluxed for twenty hours while stirring. The hot solution is filtered, the residue is washed with hot benzene, and the combined filtrates are evaporated under reduced pressure. The residual oil is triturated with diethyl ether and yields the crystalline 3 - benzhydryl - 1 - cyanomethyl-piperidine, M.P. 120–122° (with decomposition).

A solution of 16.0 g. of 3-benzhydryl-1-cyanomethyl-piperidine in 100 ml. of tetrahydrofuran is added over a period of thirty minutes to a solution of 4.5 g. of lithium aluminum hydride in 100 ml. of tetrahydrofuran while stirring. After agitating for an additional three hours at room temperature, the reaction mixture is allowed to stand overnight, and is then cooled in an ice-bath and decomposed by adding in the following order 13.5 ml. of ethyl acetate, 4.5 ml. of water, 9.0 ml. of a 15 percent aqueous solution of sodium hydroxide and 13.5 ml. of water. After stirring for thirty minutes, the reaction mixture is filtered, the solid material is washed with tetrahydrofuran, and the combined filtrates are evaporated under reduced pressure. The desired 1-(2-aminoethyl)-3-benzhydryl-piperidine of the formula

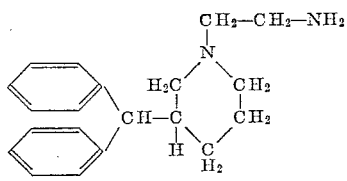

is distilled and collected at 162–166°/0.15 mm.; yield: 12.7 g.

Example 2

A solution of 12.7 g. of 1-(2-aminoethyl)-3-benzhydryl-piperidine and 5.4 g. of S-methyl-isothiourea hydrochloride in 30 ml. of anhydrous ethanol is refluxed for three hours, and is then allowed to stand overnight at room temperature. The solvent is evaporated under reduced pressure; the residue is treated with acetone and the solvent is again evaporated. The gummy residue is dissolved in isopropanol, the solution is diluted with diethyl ether, and the liquid phase is decanted from the resulting product, which is triturated with diethyl ether until crystallization occurs. The desired 3-benzhydryl-1-(2-guanidinoethyl)-piperidine hydrochloride of the formula

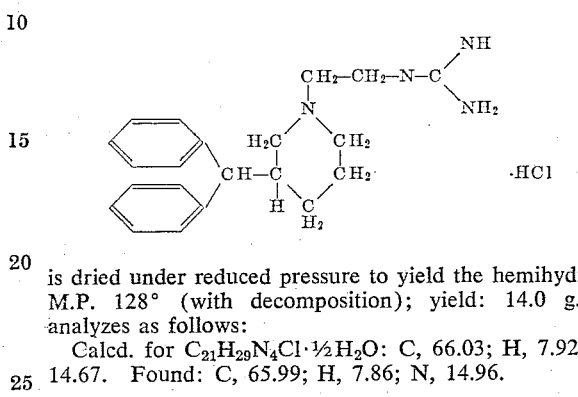

is dried under reduced pressure to yield the hemihydrate, M.P. 128° (with decomposition); yield: 14.0 g. It analyzes as follows:

Calcd. for $C_{21}H_{29}N_4Cl \cdot \frac{1}{2}H_2O$: C, 66.03; H, 7.92; N, 14.67. Found: C, 65.99; H, 7.86; N, 14.96.

Example 3

A solution of 2.6 g. of N,N',S-trimethyl-isothiourea hydrochloride and 5.0 g. of 1-(2-aminoethyl)-4-benzhydryl-piperidine in 15 ml. of ethanol is refluxed for three hours. The solvent is removed under reduced pressure, and the residue crystallizes on adding acetone and chilling. After recrystallizing it from isopropanol, the 4-benzhydryl-1-[2-(2,3-dimethyl-guanidino) - ethyl] - piperidine hydrochloride of the formula

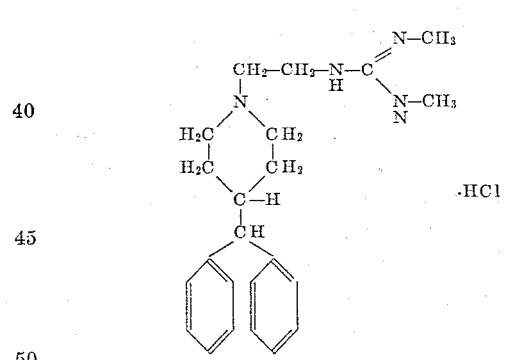

melts at 132–133° (with decomposition) and contains a mole of ethanol of crystallization which can not be eliminated by repeated recrystallizations. It analyzes as follows:

Calcd. for $C_{23}H_{33}N_4Cl \cdot C_2H_5OH$: C, 67.16; H, 8.79; N, 12.53. Found: C, 66.91; H, 8.88; N, 12.52.

The starting material used in the above procedure is prepared as follows: A solution of 25.1 g. of 4-benzhydryl-piperidine and 8.3 g. of chloroacetonitrile in 200 ml. of toluene and 2.0 ml. of water is stirred at reflux temperature for twelve hours in the presence of 31.8 g. of sodium carbonate. The reaction mixture is worked up as described in Example 1 to yield the 4-benzhydryl-1-cyanomethyl-piperidine, M.P. 145–146°; yield: 24.5 g.

To a solution of 7.8 g. of lithium aluminum hydride in 145 ml. of tetrahydrofuran is added over a period of two hours, 24.5 g. of 4-benzhydryl-1-cyanomethyl-piperidine in 245 ml. of tetrahydrofuran. After stirring for fifty hours at room temperature, the reaction mixture is decomposed by adding 23.4 ml. of ethyl acetate, 7.8 ml. of water, 15.6 ml. of a 15 percent aqueous solution of sodium hydroxide and 23.4 ml. of water. Stirring is continued for thirty minutes; the solid material is filtered off and washed with tetrahydrofuran, and the combined filtrates are evaporated. The desired 1-(2-aminomethyl)-4-benzhydrylpiperidine of the formula

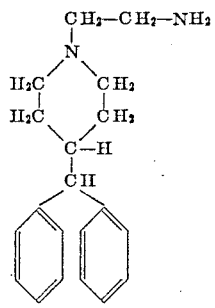

is purified by distillation and collected at 165–168°/0.025 mm.; yield: 16.9 g.

*Example 4*

A mixture of 5.0 g. of 1-(2-aminoethyl)-3-benzhydryl-piperidine and 2.1 g. of S-methyl-isothiourea hydrochloride in 15 ml. of anhydrous ethanol is refluxed for three hours. The solvent is evaporated under reduced pressure; the residual oil is dissolved in acetone and the solvent is again evaporated. The residue is taken up into ethyl methyl ketone; the solution is treated with a charcoal preparation and is filtered into an excess of diethyl ether. A gummy material separates, which is redissolved in ethanol and treated with hydrogen chloride in ethanol. A gummy material precipitates upon the addition of diethyl ether, which is redissolved in isopropanol and treated with a charcoal preparation. After filtering into diethyl ether, the crystalline 3-benzhydryl-1-(2-guanidino-ethyl)-piperidine dihydrochloride of the formula

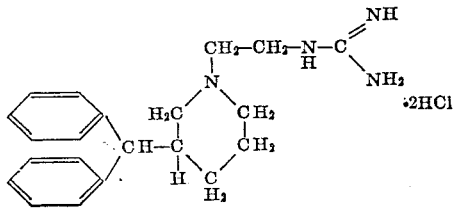

is obtained as the hemihydrate, which melts at 163–166° (with decomposition); yield: 4.5 g. It analyzes as follows:

Calcd. for $C_{21}H_{28}N_4 \cdot 2HCl \cdot \frac{1}{2}H_2O$: C, 60.30; H, 7.48; N, 13.40. Found: C, 59.82; H, 7.94; N, 13.74.

*Example 5*

Other compounds of this invention which are prepared according to the above described and illustrated procedure by selecting the appropriate starting materials, are shown in the table below.

The starting materials used in the preparation of the above compounds are prepared as previously described. The N,N-alkylene-imine intermediates, in which one of the ring carbon atoms of the alkylene portion is substituted by a group of the formula

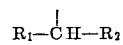

in which $R_1$ and $R_2$ have the previously-given meaning, are known or are prepared according to known methods. For example, piperidines having a benzhydryl group are obtained by reducing the pyridine portion in a correspondingly substituted pyridine compound, for example, by treatment of the latter with hydrogen at about three atmospheres in the presence of platinum oxide and at room temperature. One of the phenyl groups of a benzhydryl substituent may be converted into cyclohexyl, for example, by treating an N,N-alkylene-imine intermediate having a benzhydryl group with hydrogen at about 150 atmospheres, in the presence of platinum oxide and at about 100°, whereas the second phenyl group of a benzhydryl substituent is converted into cyclohexyl by carrying out the catalytic hydrogenation at about 150 atmospheres, in the presence of Raney-nickel and at a temperature of about 100°.

*Example 6*

Capsules, each containing 0.2 g. of 3-benzhydryl-1-

| N-(Amino-lower alkyl)-N,N-alkylene-imine starting material | Reagent | N-(Guanidino-lower alkyl)-N,N-alkylene-imine products |
|---|---|---|
| 1-(2-aminoethyl)-2-benzhydryl-piperidine | S-methyl-isothiourea hydrochloride | 1-(2-guanidino-ethyl)-2-benzhydryl-piperidine hydrochloride |
| Do | N,N',S-trimethyl-isothiourea sulfate | 1-[2-(2,3-dimethyl-guanidino)-ethyl]-2-benzhydryl-piperidine sulfate |
| 1-(2-aminoethyl)-2-[α-(4-chloro-phenyl)-benzyl]-piperidine | S-methyl-isothiourea hydrochloride | 2-[α-(4-chloro-phenyl)-benzyl]-1-(2-guanidino-ethyl)-piperidine hydrochloride |
| 1-(2-aminomethyl)-2-(α-cyclohexyl-benzyl)-piperidine | do | 2-(α-cyclohexyl-benzyl)-1-(2-guanidino-ethyl)-piperidine hydrochloride |
| 1-(3-aminopropyl)-2-di-(4-methyl-phenyl)-methyl-piperidine | do | 2-di-(4-methyl-phenyl)-methyl-1-(3-guanidino-propyl)-piperidine hydrochloride |
| 1-(2-aminoethyl)-3-benzhydryl-piperidine | N,S-dimethyl-isothiourea sulfate | 3-benzhydryl-1-[2-(2-methyl-guanidino)-ethyl]-piperidine sulfate |
| Do | N-ethyl-S-methyl-isothiourea hydrochloride | 3-benzhydryl-1-[2-(2-ethyl-guanidino)-ethyl]-piperidine hydrochloride |
| Do | N,N',S-trimethyl-isothiourea hydrochloride | 3-benzhydryl-1-[2-(2,3-dimethyl-guanidino)-ethyl]-piperidine hydrochloride |
| Do | N,N'-diethyl-S-methyl-isothiourea hydrochloride | 3-benzhydryl-1-[2-(2,3-diethyl-guanidino)-ethyl]-piperidine hydrochloride |
| 1-(3-aminopropyl)-3-benzhydryl-piperidine | S-methyl-isothiourea hydrochloride | 3-benzhydryl-1-(3-guanidino-propyl)-piperidine hydrochloride |
| 1-(2-aminoethyl)-3-di-(4-chloro-phenyl)-methyl-piperidine | do | 3-di-(4-chloro-phenyl)-methyl-1-(2-guanidino-ethyl)-piperidine hydrochloride |
| 1-(2-aminoethyl)-3-di-(4-methoxy-phenyl)-methyl-piperidine | do | 3-di-(4-methoxy-phenyl)-methyl-1-(2-guanidino-ethyl)-piperidine hydrochloride |
| 1-(2-aminoethyl)-3-[α-(4-fluoro-phenyl)-benzyl]-piperidine | do | 3-[α-(4-fluoro-phenyl)-benzyl]-1-(2-guanidino-ethyl)-piperidine hydrochloride. |
| 1-(2-aminoethyl)-3-(α-cyclohexyl-benzyl)-piperidine | do | 3-(α-cyclohexyl-benzyl)-1-(2-guanidino-ethyl)-piperidine hydrochloride. |
| 1-(2-aminoethyl)-3-dicyclohexyl-methyl-piperidine | do | 3-di-cyclohexyl-methyl-1-(2-guanidino-ethyl)-piperidine hydrochloride |
| 1-(2-aminoethyl)-4-benzhydryl-piperidine | do | 4-benzhydryl-1-(2-guanidino-ethyl)-piperidine hydrochloride. |
| 1-(2-aminoethyl)-3-benzhydryl-6-methyl-piperidine | do | 3-benzhydryl-1-(2-guanidino-ethyl)-6-methyl-piperidine hydrochloride. |
| 1-(2-aminoethyl)-3-benzhydryl-piperidine | N-benzyl-S-methyl-isothiourea hydrochloride | 3-benzhydryl-1-[2-(2-benzyl-guanidino)-ethyl]-piperidine hydrochloride. |
| 1-(2-aminoethyl)-3-benzhydryl-pyrrolidine | S-methyl-isothiourea hydrochloride | 3-benzhydryl-1-(2-guanidino-ethyl)-pyrroldine hydrochloride. |
| 1-(2-aminoethyl-)-2-benzhydryl-2,3,4,5,6,7-hexahydro-azepine | S-methyl-isothiourea sulfate | 2-benzhydryl-1-(2-guanidino-ethyl)-2,3,4,5,6,7-hexahydro-azepine sulfate. |
| 1-(3-aminopropyl)-2-benzhydryl-2,3,4,5,6,7-hexahydro-azepine | N,S-dimethyl-isothiourea hydrochloride | 2-benzhydryl-1-(3-guanidino-propyl)-2,3,4,5,6,7-hexahydro-azepine hydrochloride. |
| 1-(2-aminoethyl)-2-benzhydryl-1,2,3,4,5,6,7,8-octahydro-azocine | S-methyl-isothiourea hydrochloride | 2-benzhydryl-1-(2-guanidino-ethyl)-1,2,3,4,5,6,7,8-octahydro-azocine hydrochloride. |

(2-guanidino-ethyl)-piperidine hydrochloride, are prepared as follows (for 10,000 capsules):

Ingredients: G.
3-benzhydryl-1-(2-guanidino-ethyl)-piperidine
  hydrochloride _____ 2,000.0
Lactose USP _____ 1,500.0

The lactose is placed in a suitable mixer, the 3-benzhydryl-1-(2-guanidino-ethyl)-piperidine hydrochloride is added and the mixture is agitated until the powders are homogeneously distributed. Portions of 0.350 g. of the resulting mixture are then filled into No. 1 gelatin capsules.

What is claimed is:
1. A member selected from the group consisting of a compound of the formula

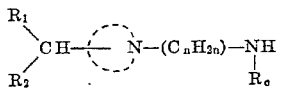

in which each of the groups $R_1$ and $R_2$ is a member selected from the group consisting of a monocyclic carbocyclic aryl group and a monocyclic hexacyclic alicyclic group, the group of the formula

is an N,N-alkylene-imino group having from five to eight ring members, and in which one of its ring carbon atoms is substituted by the group of the formula

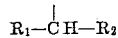

the group of the formula —($C_nH_{2n}$)— is lower alkylene separating the amino group from the imino-nitrogen by at least two carbon atoms, and the group $R_c$ is hydrogen, lower alkyl and phenyl-lower alkyl, and an acid addition salt thereof.

2. A member selected from the group consisting of a compound of the formula

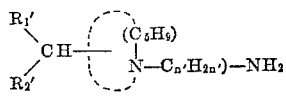

in which each of the groups $R_1'$ and $R_2'$ is a member selected from the group consisting of phenyl, (lower alkyl)-phenyl, (lower alkoxy)-phenyl, (halogeno)-phenyl and cyclohexyl, the group of the formula —($C_5H_9$) is a 1,5-pentylene radical substituted by the group of the formula

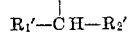

and the group of the formula —($C_{n'}H_{2n'}$)— is alkylene having from two to three carbon atoms and separating the amino group from the ring nitrogen by two or three carbon atoms, and an acid addition salt thereof.

3. A member selected from the group consisting of a compound of the formula

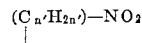
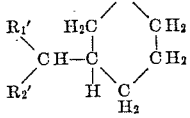

in which each of the groups $R_1'$ and $R_2'$ is a member selected from the group consisting of phenyl, (lower alkyl)-phenyl, (lower alkoxy)-phenyl, (halogeno)-phenyl and cyclohexyl, and the group of the formula —($C_{n'}H_{2n'}$)— is alkylene having from two to three carbon atoms and separating the amino group from the ring nitrogen by two to three carbon atoms, and an acid addition salt thereof.

4. 1-(2-aminoethyl)-3-benzhydryl-piperidine.
5. 1-(2-aminoethyl)-4-benzhydryl-piperidine.

References Cited by the Examiner
UNITED STATES PATENTS

| | | | |
|---|---|---|---|
| 2,075,359 | 3/1930 | Salzberg et al. | 167—22 |
| 2,622,880 | 12/1952 | Hopff et al. | 260—239 |
| 2,928,829 | 3/1960 | Mull | 260—313 |
| 3,092,636 | 6/1963 | Heinzelman et al. | 260—293 |
| 3,158,609 | 11/1964 | Hamilton et al. | 260—293 |

WALTER A. MONDANCE, *Primary Examiner.*

JOHN D. RANDOLPH, *Examiner.*

AVROM D. SPEVACK, *Assistant Examiner.*